(12) United States Patent
Namm et al.

(10) Patent No.: US 9,521,702 B2
(45) Date of Patent: Dec. 13, 2016

(54) METHOD AND APPARATUS FOR SCANNING AMONGST TWO-WAY RADIOS

(75) Inventors: Joseph C. Namm, Plantation, FL (US); Graeme P. Johnson, Plantation, FL (US); David R. Mills, West Palm Beach, FL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 1455 days.

(21) Appl. No.: 12/891,243

(22) Filed: Sep. 27, 2010

(65) Prior Publication Data

US 2012/0077491 A1    Mar. 29, 2012

(51) Int. Cl.
*H04W 4/00* (2009.01)
*H04W 84/08* (2009.01)
*H04W 8/18* (2009.01)
*H04W 48/18* (2009.01)

(52) U.S. Cl.
CPC .............. *H04W 84/08* (2013.01); *H04W 8/18* (2013.01); *H04W 48/18* (2013.01)

(58) Field of Classification Search
CPC ......... H04W 84/08; H04W 8/18; H04W 48/18
See application file for complete search history.

(56) References Cited

U.S. PATENT DOCUMENTS

| 6,807,163 | B1 | 10/2004 | Shi |
| 7,359,676 | B2 | 4/2008 | Hrastar |
| 2002/0082010 | A1 | 6/2002 | Koorapaty et al. |
| 2006/0274714 | A1* | 12/2006 | Chowdhary et al. ......... 370/347 |
| 2007/0254649 | A1* | 11/2007 | Klein et al. .................... 455/434 |
| 2009/0156210 | A1 | 6/2009 | Ponce De Leon et al. |
| 2009/0323609 | A1 | 12/2009 | Walton |

FOREIGN PATENT DOCUMENTS

EP    2207382 A1    7/2010

OTHER PUBLICATIONS

Public Safety Wireless Network (PSWN)—Comparisons of Conventional and Trunked Systems—May 1999—68 pages.
International Search Report and Written Opinion mailed on Oct. 20, 2011 for International Application No. PCT/US2011/048724.
Motorola: "MOTOTRBO System Planner—extracts—chapter 2.5 Scan," Mar. 1, 2010. Retrieved from the Internet: http://ap3.motorola.com/anz/mototrbo/resources/pdf/MOTOTRBO_System_Planner_1.6a.pdf.
Australian Office Action Dated March 17, 2014 for Counterpart Application 2011307523.

* cited by examiner

*Primary Examiner* — Marcos Batista
(74) *Attorney, Agent, or Firm* — Daniel R. Bestor

(57) ABSTRACT

A method and apparatus for scanning amongst two-way radios is disclosed. The method includes applying a scan probability index (SPI) to each member of a scan list, the SPI indicating a likelihood of channel activity. The SPI is dynamically updated by a variety of processes. Members are loaded from the scan list, and the SPI of the loaded member is compared to a threshold. Members are skipped or checked for activity based on the SPI passing or failing the threshold. Members having a sufficient SPI will proceed to have detected channel activity decoded. The method and apparatus may utilize both normal scan members and vote scan member frequencies.

13 Claims, 7 Drawing Sheets

METHOD AND APPARATUS FOR SCANNING AMONGST TWO-WAY RADIOS

FIELD OF THE DISCLOSURE

The present disclosure relates generally to communication systems, and more particularly, to scanning techniques for use in two-way radio communication systems.

BACKGROUND

Land mobile radio (LMR) networks are critical for public safety communications. In general LMR systems are embodied within conventional, trunked or a combination of conventional and trunked systems. Two-way radios, also referred to as subscriber units, operating within the LMR system can transmit as well as receive and provide users with the ability to wirelessly communicate over a radio channel. Two-way radios are available in mobile, stationary base, hand-held portable, and vehicle mounted configurations.

Scanning techniques are used in two-way radio communication systems to monitor call activity amongst a group of radios or across multiples groups of radios. Members of the group or groups are typically referred to as scan list members. From a user standpoint, scanning allows a radio user involved in a group call or individual call to simultaneously scan for any call activity occurring amongst the scan list members and join a call already in-progress. Thus, a radio user, such as a supervisor, can effectively monitor a number of different groups and take part in their calls as required. When scanning, a radio spends time checking for activity from every member in the scan list regardless of whether or not the subscriber is in the coverage area of a given list member. Scanning for activity from every member takes a considerable amount of time. Current scan list implementations limit the number of channels that can be in the list in order to limit the total time it takes to check for activity on any one of the channels. For this reason, it is impractical to have large scan lists or merge a multi-frequency scan system with other conventional channels into one list since the likelihood of missed activity increases.

Accordingly, there is a need for an improved scanning technique to be used within a two-way radio communication system.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Features of the present invention, which are believed to be novel, are set forth in the drawings and more particularly in the appended claims. The invention, together with the further objects and advantages thereof may be best understood with reference to the following description, taken in conjunction with the accompanying drawings. The drawings show a form of the invention that is presently preferred; however, the invention is not limited to the precise arrangement shown in the drawings.

Figure 1:
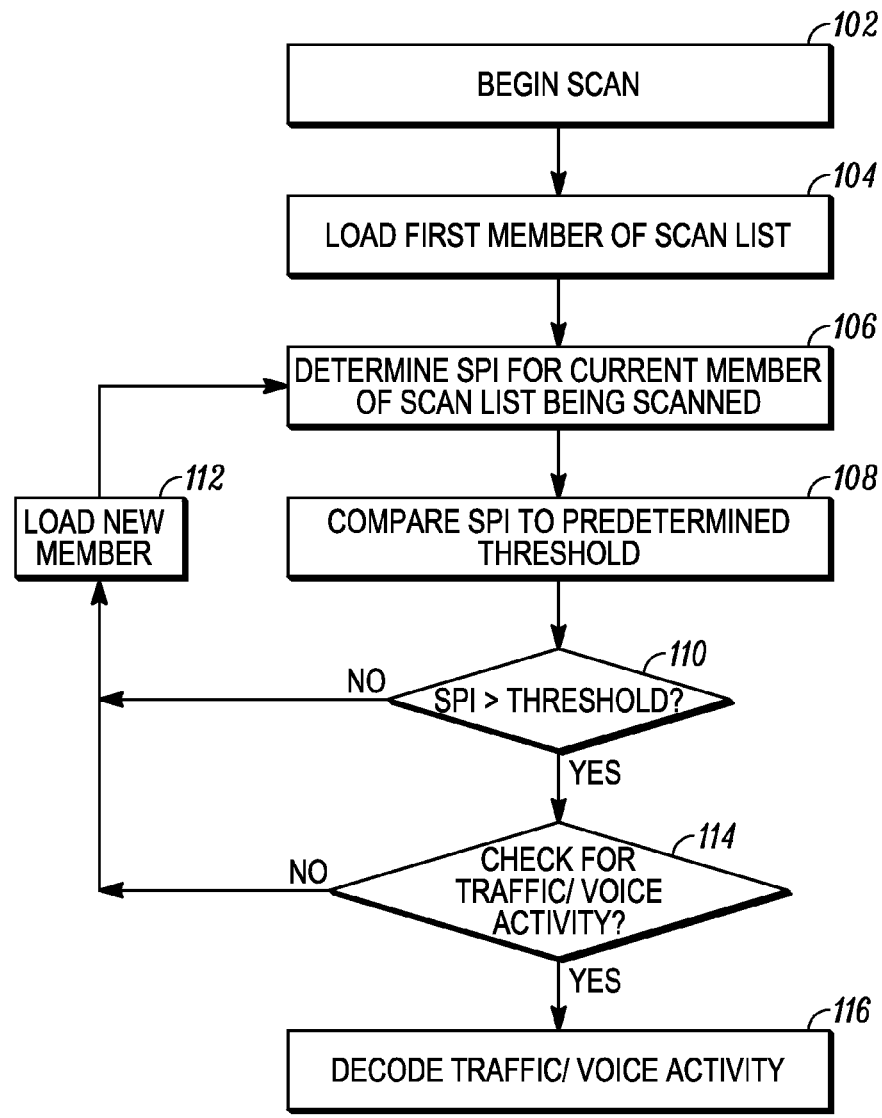
FIG. 1 is flowchart of a method for radio scan in accordance with an embodiment of the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and system components related to a method and apparatus for scanning amongst subscriber units of a communication system. Accordingly, the system components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In the description herein, numerous specific examples are given to provide a thorough understanding of various embodiments of the invention. The examples are included for illustrative purpose only and are not intended to be exhaustive or to limit the invention in any way. It should be noted that various equivalent modifications are possible within the spirit and scope of the present invention. One skilled in the relevant art will recognize, however, that an embodiment of the invention can be practiced with or without the apparatuses, systems, assemblies, methods, components mentioned in the description.

Briefly, there is described herein a scanning technique which utilizes a scan list in which a scan probability index (SPI) is applied to each member of the scan list, the SPI indicating a likelihood of channel activity. The SPI is dynamically managed such that members of the scan list are scanned for activity or skipped in accordance with SPI level and channel activity detection. Thus, scan time can be minimized and scan lists can be maintained and managed efficiently by temporarily removing members from the scan list in which little or no channel activity occurs.

Referring to FIG. 1, there is shown a flowchart 100 in accordance with an embodiment of the invention. Method 100 begins scanning at 102 by loading a first member of a scan list at 104. Each member of the scan list has a scanning probability index (SPI) associated therewith. At 106, the SPI for the loaded member is determined and compared at 108 to a predetermined SPI threshold. If the SPI fails to meet the predetermined SPI threshold at 110, then the member is skipped and a new member from the scan list is loaded at 112 prior to returning to 106. If the predetermined SPI threshold was met at 110, then a check is made for channel activity at 114. If channel activity is not detected at 114, the member is skipped and a new member from the scan list is loaded at 112 prior to returning to 106. If channel activity is detected. at 114, then the detected channel activity is decoded at 116.

In accordance with the various embodiments, the scan list members of method 100 may comprise normal channels and one or more vote scan channels. Normal channels are channels representing a single conventional frequency, single conventional repeater frequency, or a group within trunked system. The one or more vote scan channels are channels provided by a system of repeaters covering one geographic area using the same receive frequencies and different transmit frequencies (or vice versa). The detailed explanations involving the different channels and different scanning algorithms used with these channels are provided within the descriptions of the subsequent figures.

FIGS. 2A, 2B, 2C, 2D, and 2E show a series of flowcharts representing more detailed embodiments of the method of FIG. 1. Method 200 provides a dynamic scanning technique that takes into account the SPI, the member type and channel activity such that scan time is optimized and scan lists are efficiently maintained and updated.

Figure 2A:
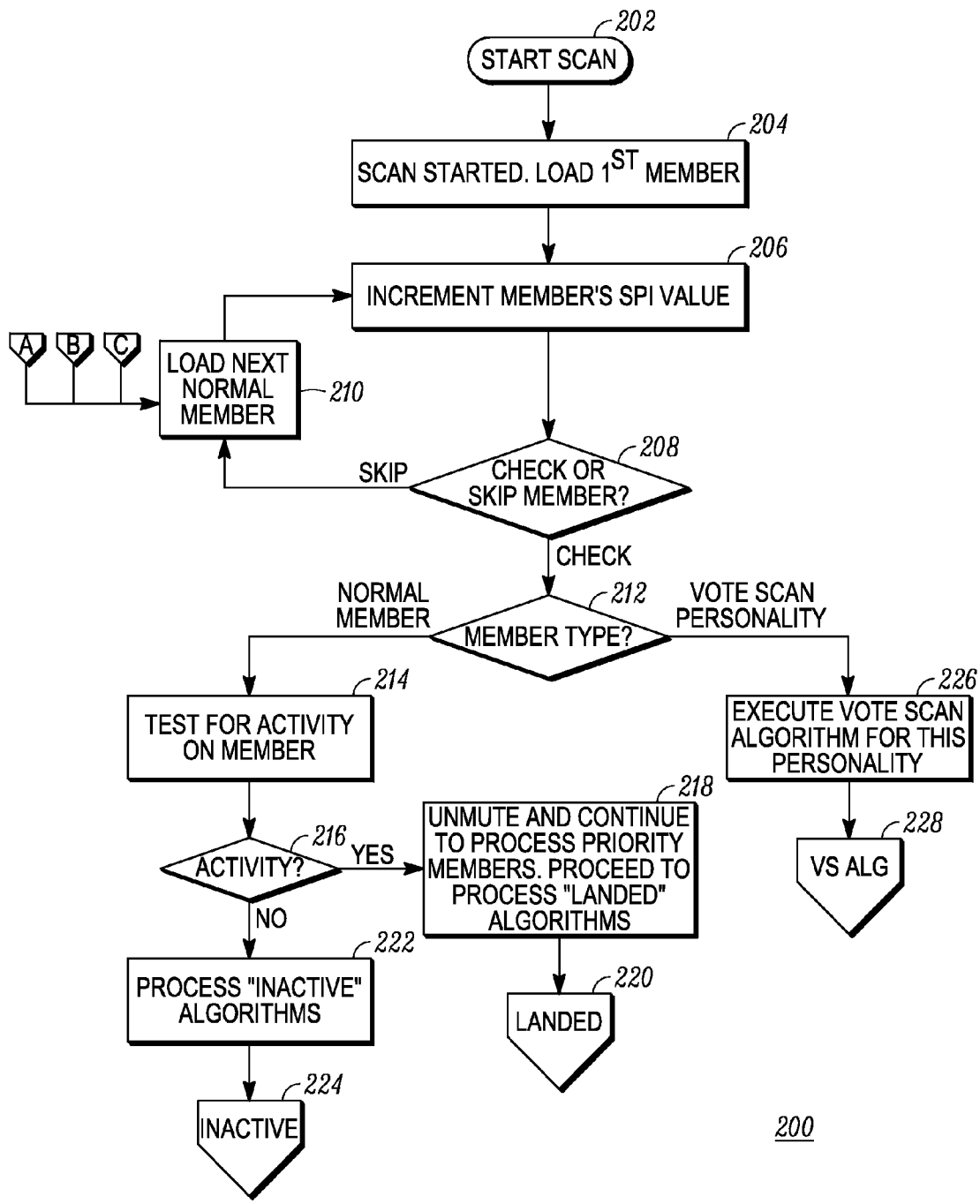
FIG. 2A is a portion of a flowchart for radio in accordance with an embodiment of the invention.

Beginning with FIG. 2A, scanning begins at 202 by loading a first member from a scan list at 204. The scan list contains normal members and vote scan members. Any member can be designated as a priority member. Vote scan members are represented by a list of frequencies representing the member's vote scan system. Each vote scan member is composed of a list of vote scan system frequencies. Each member of the scan list has a scan probability index (SPI) associated therewith. The SPI is a dynamically managed and adjusted by the algorithms provided within method 200. Members with SPI values that drop below a predetermined threshold will not be checked for activity, resulting in these members being temporarily removed from the scan list. Members that have been removed are added back into the scan list when their SPI rises above the predetermined SPI threshold.

The member's SPI is incremented at 206. The member's SPI will be incremented at each pass through the scan list until the SPI is maximized. The incrementing of the SPI allows members that have been removed from the list to slowly recover the member's SPI. The period of time it takes for a member's SPI to fully recover is thus related to how large the current scan list is and how long it takes for each pass.

Moving to 208 a determination is made whether to check or skip the member. The decision is made by testing the SPI of each member. If the SPI fails to meet a predetermined SPI threshold at 208 then a new member is loaded from the scan list at 210, prior to returning to 206 to increment the loaded member's SPI value. If the SPI meets the predetermined SPI threshold at 208, then a check is made at 212 to determine the member type.

Depending on the member type determined at 212, the technique 200 down a normal member scan path or a vote scan path. When a member is determined to be a normal member at 212, then a test for activity on the normal member channel occurs at 214. Depending on the detection of activity at 216, the normal member may be processed through inactive path algorithms 222, 224 or unmuted and processed through landed algorithms at 218, 220.

For the embodiment in which activity is detected at 216, the channel is unmuted at 218 and the technique continues to landed algorithms at 220. It should be noted that other priority members (such as priority vote scan members) may also be scanned for activity during the activity of a non-priority member. Referring now to FIG. 2C, the landed algorithm comprises applying a coverage exclusion algorithm in which modification of the member's SPI occurs. Other algorithms can be applied at this state as well at 256. Once the coverage exclusion (and/or other algorithms) has been applied at 254, 256, a determination is made again as to the member type at 258. If the scan list member is a normal member at 258, then the method returns to step 210 to load the next member. If the member type at 258 is determined to be a vote scan system frequency, then a vote scan received signal strength (RSSI) algorithm is applied at 260 by proceeding the vote scan algorithm at 236 of FIG. 3B. The RSSI algorithm will be described later in conjunction with FIG. 2B.

Returning to FIG. 2A, the path followed by the normal member when no activity is detected at 216 is now described. When no activity is detected at a normal member at 216, the technique proceeds to inactive algorithms at 222 which follow at 224 at FIG. 2D. Referring to FIG. 2D, the inactive path applies a subscriber unit (SU) location algorithm at 264. Based on current location, the subscriber will learn what sites are available. A generalized list of locations with available coverage areas (scan list members) will be maintained in the subscriber. If this member should not have coverage at the subscriber's current location, then the current member will have their SPI lowered—this will prevent them from being scanned until their SPI recovers. Other algorithms may also be applied to inactive members at 266. At 268, based on the member type (scan list member or vote scan member) the method returns to either load the next member at 210 of FIG. 2A or to the vote scan flow at 236 of FIG. 2B.

Figure 2B:
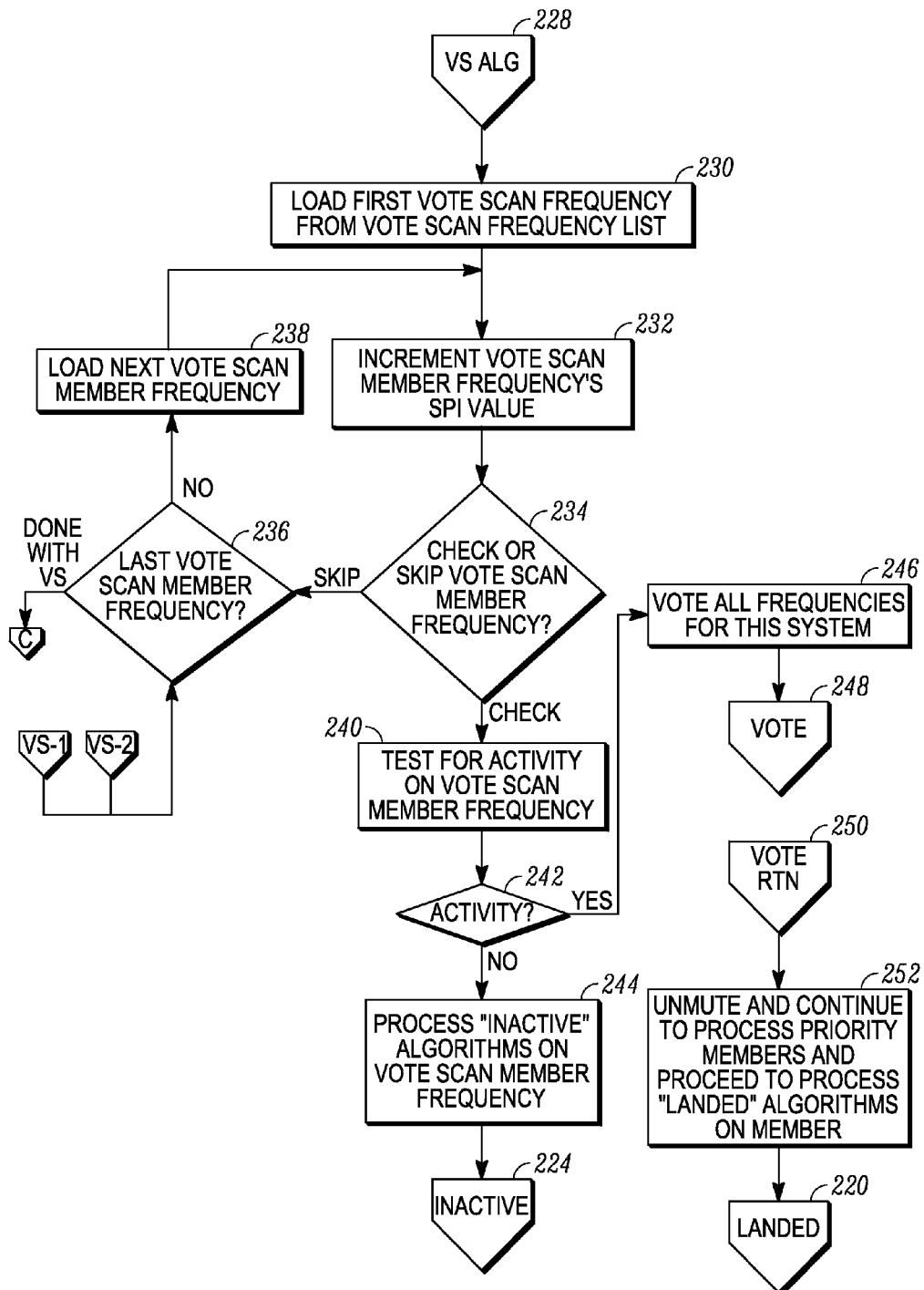
FIG. 2B is another portion of the flowchart of FIG. 1 in accordance with an embodiment of the invention.
Figure 2C:
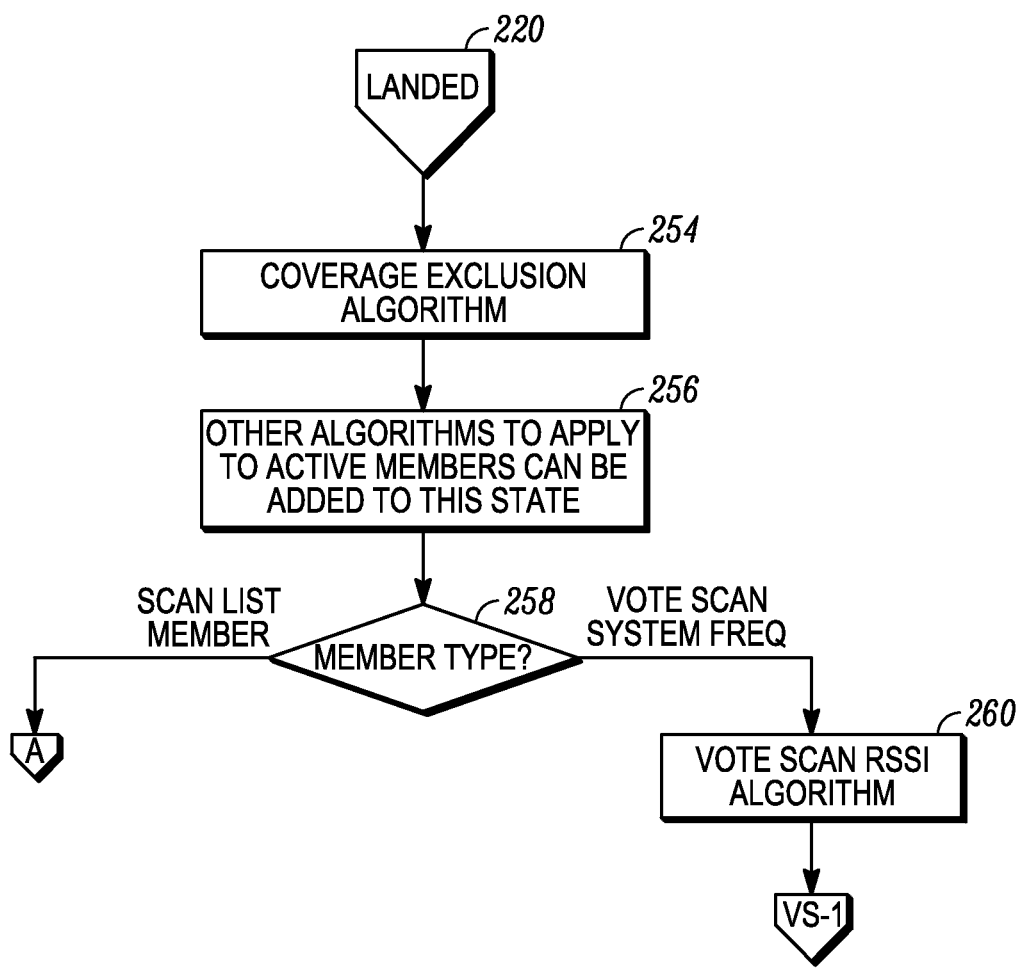
FIG. 2C is another portion of the flowchart of FIG. 1 in accordance with an embodiment of the invention.
Figure 2D:
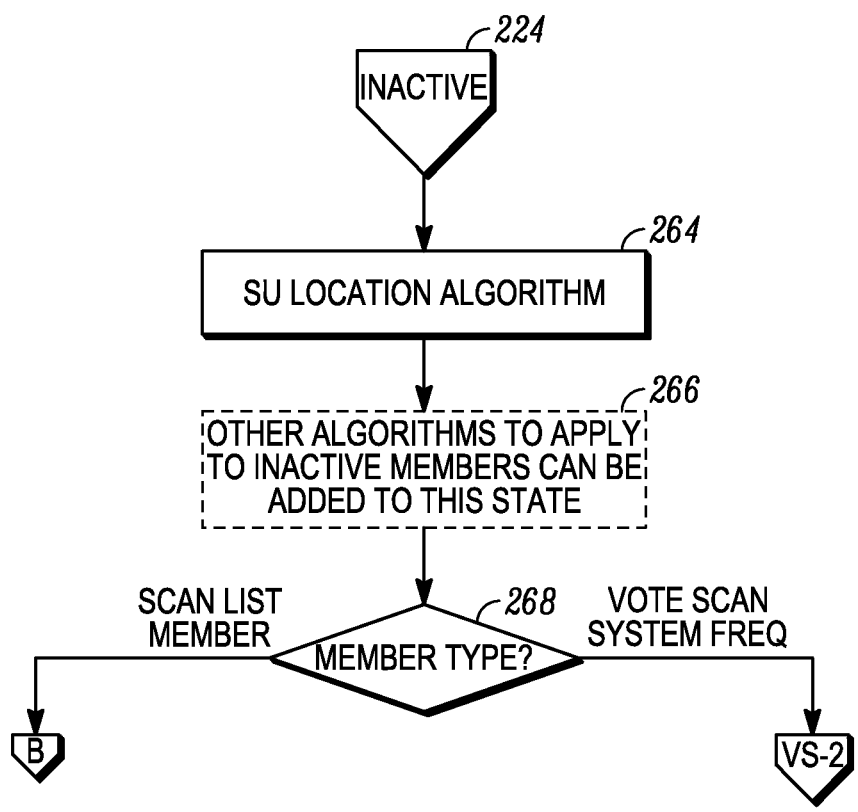
FIG. 2D is another portion of the flowchart of FIG. 1 in accordance with an embodiment of the invention.

Returning to FIG. 2A, when the member type is initially determined to be a vote scan member at 212, then a vote scan algorithm path is taken via 226, 228 and as described in FIG. 2B. Referring to FIG. 2B, the vote scan algorithm may thus be entered into from several different routes/paths. The vote scan algorithm of FIG. 2B may be applied upon an initial determination that the scan list member is a vote scan member at 212.

Beginning through the initial path of FIG. 2B, the vote scan member algorithm loads a first vote scan member frequency from the vote scan frequency list at 230 and increments the vote scan member frequency's SPI value at 232 A determination is made at 234 as to whether to check or skip the vote scan member frequency based on the SPI value. If the decision is made to skip the vote scan member frequency, the technique verifies whether this is the last vote scan member frequency of the list at 236. Likewise, the other two paths (from the landed path of FIG. 2C or the inactive path of FIG. 2D) arrive at this point to check on whether the last vote scan member frequency is being processed at 236. If the last vote scan member frequency is determined at 236 then the vote scan is completed, and the technique returns to 210 (of FIG. 2A) to load a new normal member.

If a determination is made that the last vote scan member frequency has not been reached at 236, then the next vote scan member frequency is loaded at 238 and that next member's SPI is incremented at 232, and a decision of skip or check is made at 234. When the vote scan member frequency's SPI level is such that a check decision is made at 234, then a test for channel activity is made at 242. If no channel activity is detected at 242, then the technique proceeds to process inactive algorithms on the vote scan member frequency at 244 and proceed through to the inactive path at 224 (to FIG. 2D). If channel activity is detected at 242, then a vote is taken of vote scan frequencies for this system at 246 which then proceeds to the vote path at 248 (FIG. 2E).

Figure 2E:
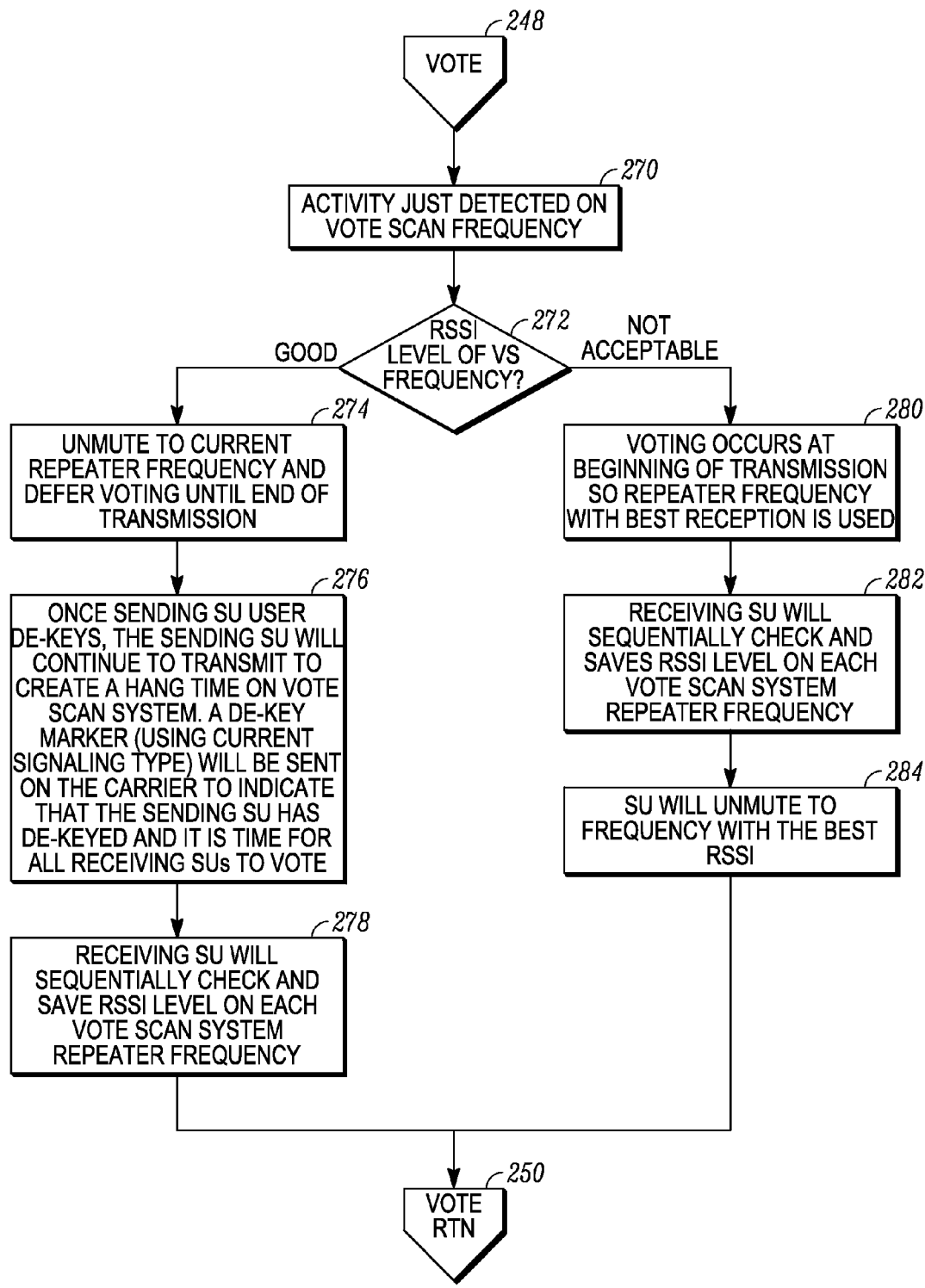
FIG. 2E is another portion of the flowchart of FIG. 1 in accordance with an embodiment of the invention.

The vote path 248 is described in conjunction with FIG. 2E. The vote path 248 examines the recent activity on the vote scan frequency and verifies whether the received signal strength (RSSI) level for that frequency is acceptable or not at 272. If the RSSI level is considered good/acceptable at 272, then the subscriber unit is unmuted to the current repeater frequency and no further voting is performed until the end of transmission at 274. This further voting is described at 276 in which the sending subscriber (or repeater) de-keys and continues to transmit to create a hang-time on the vote scan system. A subsequent de-key marker is sent on the carrier frequency to indicate that the sending subscriber unit has de-keyed and that all receiving subscribers will vote. The receiving subscriber unit(s) sequentially check and save the RSSI level on each vote scan system repeater frequency at 278 and proceed to process priority members and proceed to process landed algorithms at 252, 220. Thus, landed and inactive algorithms can be applied to both normal and vote scan members.

If the RSSI level is considered unacceptable at 272 of FIG. 2E, then the voting occurs at the beginning of transmission such that the repeater frequency with the best reception is used at 280. The receiving subscriber unit sequentially checks and saves the RSSI level on each vote scan system repeater at 282, and the subscriber unit unmutes to the frequency with the best RSSI at 284. Alternatively, the subscriber can unmute to the vote scan member frequency with unacceptable RSSI while sequentially sampling the remaining vote scan member frequencies until a vote scan member frequency with acceptable RSSI is found.

Ultimately, whether the vote scan frequency had an acceptable RSSI allowing the radio to unmute immediately at 274 or an unacceptable RSSI forcing the voting to occur at the beginning of the transmission prior to unmuting, the voting algorithm returns at 250 to unmute and continue to process priority members and proceed to process priority members using landed algorithms (see FIG. 2B). Thus, the landed and inactive algorithms can also apply to vote scan member frequencies as well as normal scan list members.

Figure 3:
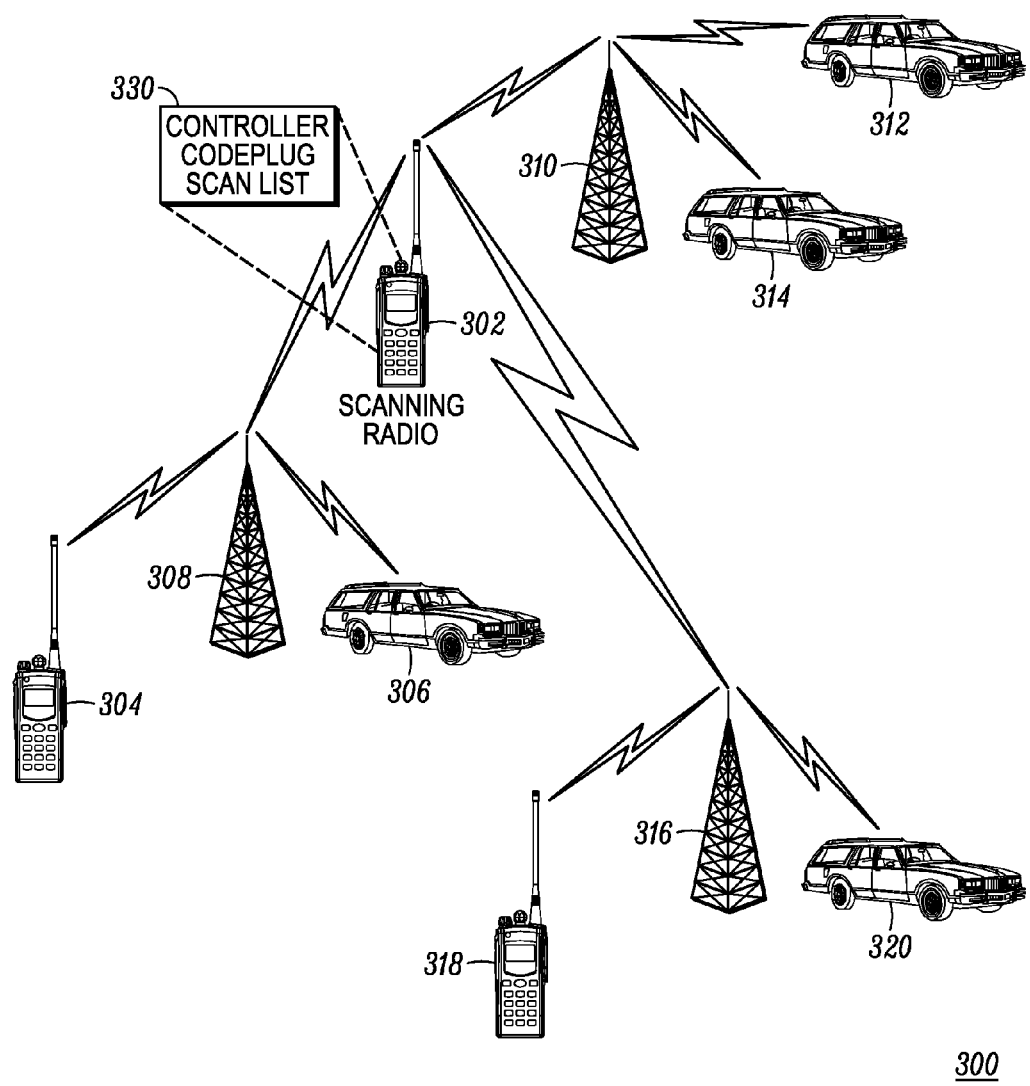
FIG. 3 shows a communication system operating in accordance with the various embodiments.

FIG. 3 is a communication system 300, such as a Land Mobile Radio (LMR) communication system. The communication system 300 may be a conventional system or a trunked system or a combination of conventional and trunked systems comprising a plurality of subscriber units 302, 304, 306, 312, 314, 320 and repeaters 308, 310, 316. The plurality of subscriber units may be handheld radio, vehicular radios, and/or other additional mobile or stationary subscriber units. Communication system 300 operates in accordance with the scanning technique provided by the various embodiments of the invention.

For the purposes of example, at least one of the plurality of radios is scanning, in this case scanning radio 302, and the plurality of repeater stations operate over predetermined coverage areas. The scanning radio 302 has a controller 330 having a codeplug within which a scan list having scan list members is stored, each scan list member having a scan probability index (SPI) associated therewith. In accordance with the various embodiments, each SPI is dynamically adjusted in response to a plurality of scan algorithms, the plurality of scan algorithms being dynamically selected for scanning based on scan list member type, detected activity, and the predetermined coverage areas.

The utilization of the SPI within communication system 300 results in scanning radio 302 not having to scan members that have little or no probability of activity thereby providing the benefit of reducing the time to scan a list of members. Removing non-active members from the list allows the scan list of active members to be added to, thereby increasing efficiency. The utilization of a SPI also facilitates the integration of a vote scan system into the normal scan list with far less impact to scan performance.

Integrating the vote scan system into communication system 300 allows multiple repeaters 308, 310, 316 with the same Rx (or same TX freq—this is called a TX steering vote scan system) that provide coverage for an area for one channel. The subscriber 302 uses the repeater (for Tx and Rx) (308, 310 or 316) with the best signal strength when communicating. All repeaters 308, 310, 316 are connected and simulcast audio to each other. Thus, the repeaters which initially operated over predetermined single coverage areas may now operate over a combined larger coverage area with improved efficiency.

The above described methods and embodiments facilitate scanning amongst two-way radios. Therefore, a user of a two-way radio, using the scanning techniques, can efficiently and quickly communicate with another radio or a group of radios. Land Mobile Radio communication systems operating within a public safety environment will benefit from the improved timing and efficiency provided by the scanning techniques of various embodiments.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. A device or structure that is "configured" in a certain way is configured in at least that way, but may also be configured in ways that are not listed.

It will be appreciated that some embodiments may be comprised of one or more generic or specialized processors or "processing devices" such as microprocessors, digital signal processors, customized processors and field programmable gate arrays FPGAs and unique stored program instructions including both software and firmware that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits ASICs, in which each function or some combinations of certain of the functions are implemented as custom logic. Of course, a combination of the two approaches could be used.

Moreover, an embodiment can be implemented as a computer-readable storage medium having computer readable code stored thereon for programming a computer e.g., comprising a processor to perform a method as described and claimed herein. Examples of such computer-readable storage mediums include, but are not limited to, a hard disk, a CD-ROM, an optical storage device, a magnetic storage device, a ROM Read Only Memory, a PROM Programmable Read Only Memory, an EPROM Erasable Programmable Read Only Memory, an EEPROM Electrically Erasable Programmable Read Only Memory and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for radio scanning, the method comprising:
   applying a scan probability index (SPI) to each member of a scan list, the SPI indicating a likelihood of channel activity, wherein the SPI depends upon scan list member type, detected activity, and available coverage areas;
   loading a member from the scan list;
   determining the SPI for the loaded member;
   comparing the SPI to a predetermined SPI threshold;
   skipping the member and loading a new member from the scan list in response to the SPI failing to meet the predetermined SPI threshold;
   checking for channel activity in response the SPI meeting the predetermined SPI threshold;
   skipping the member and loading a new member from the scan list in response to channel activity not being detected; and
   decoding the channel activity in response to the channel activity being detected.

2. The method of claim 1, wherein the scan list members comprise:
   normal channels; and
   one or more vote scan channels, the one or more vote scan channels being provided by a system of repeaters covering one geographic area using the same receive frequencies and different transmit frequencies.

3. The method of claim 2, further comprising:
   incrementing the SPI for each scan list member that is loaded.

4. The method of claim 3, wherein decoding channel activity when the SPI meets the predetermined threshold comprises:
   determine whether the loaded member is a normal member or a vote scan member.

5. The method of claim 4, wherein, in response to determining a normal scan member:
   testing for activity on the normal member channel;
   unmuting and decoding channel traffic in response to activity being detected on the normal member channel; and
   lowering the normal member SPI in response to inactivity being detected.

6. The method of claim 5, wherein the step of unmuting is response to activity being detected on the normal channel further comprises:
   increasing the normal scan member SPI in response to activity being detected within non-overlapping coverage areas; and
   lowering the normal scan member SPI to prevent scan in response to activity being detected within overlapping coverage areas.

7. The method of claim 4 further comprising:
   executing a vote scan algorithm in response to a vote scan member being loaded.

8. The method of claim 7, wherein the vote scan algorithm comprises:
   loading a vote scan member frequency from the vote scan frequency list;
   incrementing the vote scan member's SPI;
   comparing the vote scan SPI to a predetermined vote can SPI threshold;
   skipping the vote scan member frequency and loading another vote scan member frequency in response to the vote scan SPI failing to meet the vote scan SPI threshold;
   testing for activity on the vote scan member frequency in response to the vote scan SPI meeting the vote scan SPI threshold.

9. The method of claim 8, further comprising:
   lowering the vote scan member frequency's SPI in response to inactivity being detected; and
   voting and prioritizing all vote scan member frequencies based on a predetermined operating parameter in response to activity being detected on the vote scan member; and
   unmuting and decoding channel activity on the prioritized vote scan frequency.

10. The method of claim 9, wherein unmuting and decoding channel activity on the prioritized vote scan channel further comprises:

increasing the vote scan member SPI in response to activity being detected within non-overlapping coverage areas; and lowering the vote scan member SPI to prevent scan in response to activity being detected within overlapping coverage areas.

11. A communication system, comprising:

a plurality of radios, at least one of which is scanning;

a plurality of repeater stations operating over predetermined coverage areas; and wherein the at least one scanning radio has a controller having a codeplug within which a scan list having scan list members is stored, each scan list member having a scan probability index (SPI) associated therewith, each SPI being adjusted in response to a plurality of scan algorithms, the plurality of scan algorithms being dynamically selected for scanning based on scan list member type, detected activity, and the predetermined coverage areas.

12. The communication system of claim 11, wherein the scan list contains normal scan members and vote scan members, the vote scan members each being formed from the plurality of repeaters that receive on the same frequency and transmit on different frequencies within the same coverage areas (or vice-versa).

13. The communication system of claim 12, wherein the communication system comprises a Land Mobile Radio communication system operating within a public safety environment.

\* \* \* \* \*